UNITED STATES PATENT OFFICE.

BORIS KAZMANN, OF BATTLE CREEK, MICHIGAN, ASSIGNOR TO KELLOGG LABORATORIES, INCORPORATED, A CORPORATION OF MICHIGAN.

PROCESS FOR PRODUCING ALCOHOL FROM BURNT OR ROASTED STARCH-BEARING MATERIALS, &c.

1,267,081.      Specification of Letters Patent.      Patented May 21, 1918.

No Drawing. Application filed March 31, 1917, Serial No. 158,963. Renewed March 7, 1918. Serial No. 221,093.

*To all whom it may concern:*

Be it known that I, BORIS KAZMANN, a citizen of the United States, residing at Battle Creek, county of Calhoun, and State of Michigan, have invented a Process for Producing Alcohol from Burnt or Roasted Starch-Bearing Materials, Such as Cereals and the like, of which the following is a specification.

This invention relates to a process for producing alcohol from burnt or roasted starch-bearing materials such as cereals and the like.

Roasted or burnt cereals or other starch-bearing materials, such as result from fires or processes in which it is necessary to roast the starch-bearing material, have been heretofore regarded as unsuitable for use in the production of alcohol, as the burning or roasting action has been found to be an obstacle to the fermentation process.

In the production of food-beverages, from cereals, and substitutes for coffee and the like, there is a large residue of material which heretofore has been practically an unprofitable or wasteful burden on the manufacturers. The explanation of this lies in the character of the processes to which the starch-bearing materials are subjected in producing the food-beverages. The starch-bearing materials, either alone or mixed with extraneous saccharine matters, are roasted in comminuted form in some stage in the process. The extract obtained from this roasted material forms the desired manufacturer's product and the insoluble residue resulting from the extraction process is a by-product which heretofore has been practically wasted, principally because the roasting of the starch-bearing material has been found to render it without utility for any purpose of sufficient value to compensate sufficiently for drying and transportation charges. This residue is often run out onto dumps. In warm weather it produces objectionable odors.

I have discovered that it is possible to secure from burnt or roasted starch-bearing materials a good yield and high grade of alcohol.

Among the starch-bearing materials which are sometimes used in the production of food-beverages, are the legumes, nuts, tubers, such as taro and arrowroot; starch-bearing roots, starch-bearing grains; fruits, such as figs, prunes and bananas; starch-bearing seeds, such as cotton seed and St. John's bread; algaroba beans, fat bearing beans, such as soja beans; and grains, such as wheat, rye, barley, corn, Kafir corn and rice.

In carrying out my process, I subject the residual roasted starch-bearing materials, to a series of steps as hereinafter enumerated, it being understood however, that the steps may be altered in their order and varied in their character, within the scope of what is claimed and as indicated by the variations in the different claims without departing from the spirit of the invention.

*Step 1—Washing.*—The roasted starch-bearing material is first thoroughly washed by percolation or steeping to remove as much of the soluble roasted contents as possible. If the percolation necessary for producing the manufacturer's extract is not sufficient for this purpose, the percolation may be prolonged, but I have discovered that the extraction process is usually sufficient to wash the product.

*Step 2—Cooling.*—The residue of the food-beverage process, which is produced by roasting or otherwise treating the starch bearing materials, and then subjecting same to percolating or boiling action to extract their soluble contents for use as the food-beverage, is first cooled in any suitable manner to about thirty-five degrees Celsius.

*Step 3—Converting.*—Malt, *Aspergillus oryzæ*, or its extract, or any other suitable enzym, is added to the product. If there is not sufficient proportion of water already in the residue to allow diastatic action, more water is added. I usually prefer to employ about seventy per cent. of water. The exact proportions of the amount of diastase to the residue are dependent on the diastatic power of the particular diastatic extract, or diastase bearing material. The contact of the enzym and residue is permitted to continue until the starch is dissolved, as shown by the iodin test.

*Step 4—Mixing.*—During the period of diastatic action, the contents are mixed or agitated in any suitable manner.

*Step 5—Separation.*—The effect of the diastatic action is to solubilize the starch contents of the residue to form maltose and dextrin and the fifth step in the process is to separate the saccharine liquids from the solid and secondary residue which consists largely of protein and crude fiber. This separation may be affected in any desired manner. I either prefer to do it by means of pressing machinery or by leaching. The secondary residue consisting of protein and crude fiber may, if desired, be mixed with starchy stock feed to increase the protein and crude fiber contents thereof. The present process is however more concerned with the separated saccharine liquids.

*Step 6—Sterilization.*—The ex-pressed saccharine liquid is sterilized in any suitable manner, preferably by bringing it to a boil.

*Step 7—Inversion.*—Preferably during the sterilization, sulfuric acid is added to the saccharine liquid to invert the remaining dextrins into fermentable sugars.

*Step 8—Cooling.*—The mass is then cooled in any suitable manner.

*Step 9—Fermentation.*—Yeast, or other suitable ferment is added to produce fermentation.

*Step 10—Distillation.*—The alcohol is separated from the mother liquor, by distillation.

In subjecting the burnt grains or starch-bearing materials, such as are usually found in large quantities in grain elevators or like structures which have been consumed by fire, I prefer to employ certain steps which precede or are preliminary to the series of steps hereinbefore described. These preliminary steps are carried out usually as follows:

The burned grains, which by the time it is recovered has usually cooled off, is preferably reheated without addition of water. The effect of this reheating is to drive off or expel from the grains certain volatile anti-fermentation products by dry distillation. For the purpose of facilitating this expulsion of anti-fermentation products, I usually prefer to cool the reheated grains by passing through them a current of air which has the effect of entraining or removing the anti-fermentation products.

My object in expelling the hostile products of the burnt starch-bearing material by dry distillation and air cooling is to prevent any interference with the fermentation process by the presence of these hostile elements.

After thus preliminarily heating and cooling the burned products, the process then proceeds in the manner hereinbefore described. That is to say, the heated and cooled starch-bearing materials are washed and then subjected to the series of steps as before recited.

In the process as hereinbefore described, I accomplish the solubilization of the starch-bearing material by diastatic action and the inversion by a later addition of acid. Instead of solubilizing the starch-bearing material by diastatic action, and afterward inverting by the use of acid, I can combine the solubilization and inversion in one process by the use of any suitable acid capable of saccharizing the starch or starch-bearing material. Sulfuric, hydrochloric or any other suitable acid may be employed for this purpose.

In addition to the other changes in the processes which may be made within the scope of the claims, step 5 may be omitted; that is to say, instead of separating the saccharine liquid from the protein and crude fiber residue, the mass may be sterilized according to step 6, inverted according to step 7, cooled, fermented and distilled and the residue may be recovered after the distilling operation or it may be used as an animal feed in wet condition.

What is claimed as new, is:

1. A process of producing alcohol from roasted or burnt starch-bearing material which consists in washing the material, converting the starches into saccharine matter, fermenting the same, and separating the alcohol from the residue.

2. A process of producting alcohol from roasted or burnt starch-bearing material which consists in washing the material, fermenting same to produce alcoholic liquid, and separating out the alcohol.

3. A process of producing alcohol from roasted or burnt starch-bearing materials which consists in dissolving out the soluble ingredients converting the insoluble ingredients into maltose and dextrins, inverting the dextrins into fermentable sugars, fermenting the liquor and separating out the alcohol.

4. A process of producing alcohol from roasted or burnt starch-bearing material which consists in washing the same with hot water, cooling the insoluble residue, subjecting the residue to diastatic action to produce saccharine liquids, sterilizing the saccharine liquid, inverting the dextrins in the liquid into fermentable sugars, fermenting the liquid and distilling out the alcohol.

5. A process of producting alcohol from roasted or burnt starch-bearing material which consists in extracting the soluble contents of the roasted or burnt material, subjecting the residue to diastatic action, pressing out the saccharine liquids, inverting the dextrins thereof, into fermentable sugars, fermenting the liquids and distilling out the alcohol.

6. A process of producing alcohol from roasted or burnt starch-bearing material which consists in extracting the soluble contents of the roasted or burnt material with hot water, cooling the insoluble residue, adding a diastase thereto, and permitting the diastatic action to occur, separating the solid residue from the saccharine liquids, sterilizing the latter, inverting the dextrins thereof, into fermentable sugars with sulfuric acid, cooling the mass, fermenting the same with yeast and distilling out the alcohol.

7. A process of producing alcohol from roasted or burnt starch-bearing material which consists in extracting the soluble contents of the roasted or burnt material with hot water, cooling the insoluble residue, adding a diastatic agent thereto, mixing the product during the diastatic action, pressing the same to separate the saccharine liquids from the solid residue, sterilizing the saccharine liquids at a high temperature, inverting the dextrins into fermentable sugars by sulfuric acid, cooling the mass, adding yeast to produce fermentation and distilling out the alcohol.

8. A process of producing alcohol from roasted or burnt starch-bearing material which consists in subjecting the roasted or burnt material to dry distillation, air cooling the same, washing the product to extract the soluble contents therefrom, cooling the insoluble residue, subjecting the same to diastatic action, separating the saccharine liquids from the solid residue, sterilizing the saccharine liquids with heat, inverting the remaining dextrins thereof, into fermentable sugars by the use of acid, cooling the mass, adding yeast to produce fermentation and distilling out the alcohol.

9. A process of producing alcohol from roasted or burnt starch-bearing material which consists in reheating and air cooling the material, converting the starches into saccharine matter, fermenting the same and separating the alcohol from the residue.

10. A process of producing alcohol from roasted or burnt starch-bearing material which consists in extracting the toxic products of the dry distillation, converting the starches into saccharine matter; fermenting the same and separating the alcohol from the residue.

BORIS KAZMANN.